May 3, 1932.   E. O. SATHER   1,856,083
SIPHON DEVICE
Filed March 8, 1930

INVENTOR
BY *Edmund O. Sather*
ATTORNEY

Patented May 3, 1932

1,856,083

UNITED STATES PATENT OFFICE

EDMUND O. SATHER, OF OAKLAND, CALIFORNIA

SIPHON DEVICE

Application filed March 8, 1930. Serial No. 434,311.

This invention relates to an improved siphon device, and the object of the invention is to provide a simple, cheaply manufactured, and easily cleaned device of this character adapted for siphoning fluid, such as milk or cream from a vessel as commonly used, or for use wherever it may be found practicable.

A further object of my invention is to provide a valveless pistoned siphon intake tube cooperating with a valveless passageway in a casing adapted for starting the fluid on its course thru the siphon.

A still further object is to provide means for automatically snapping a pistoned siphon intake tube to its normal position for starting the siphonic flow.

With these and other objects in view, my invention consists in the novel construction, combination, and arrangement of parts as herein illustrated, and more specifically pointed out in the appended claims.

Reference being had to the accompanying drawings forming a part of this specification.

Figure 3:
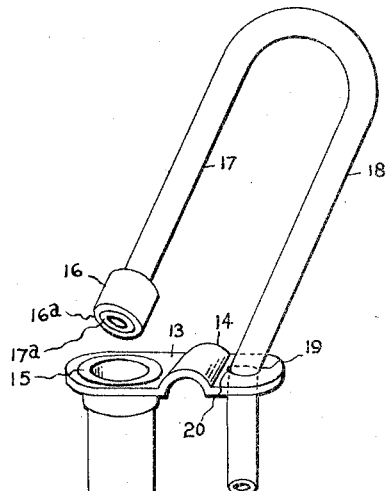
Figure 3 is a view of the siphon device in process of disassembly. The casing being partially cut away to more clearly show the piston seat.

In the drawings, 10 designates a casing preferably contracted in its lower portion to provide a piston seat 11, said seat provided in its lower portion 11ª with a passageway 12. The upper portion of said casing being provided with a siphon tube guide member 13 provided with a humped portion 14 adapted for being supported upon the top edge of a milk bottle, said guide member adapted for being pressed in position on the casing 10 and permanently fixed thereat by expanding the end of the casing, as at 15, or otherwise suitably held in position. Adapted for being slidably received in said casing is a piston 16, said piston adapted for being communicably and rigidly secured to the lower portion 17ª of the intake tube 17, and said tube being provided with a suitably bent continuation to provide an outlet tube 18 at a lower portion of which is provided still another suitable bend 19 outwardly directed to provide a limitable movement stop for cooperation with the guide member 13 through the aperture 20 therein. Said stop provided for retaining the siphon tube in relation with the casing, yet allowing the two members to be separated for being easily cleaned by slightly springing the siphon tube for disassembly, as illustrated in Figure 3.

Figure 1:
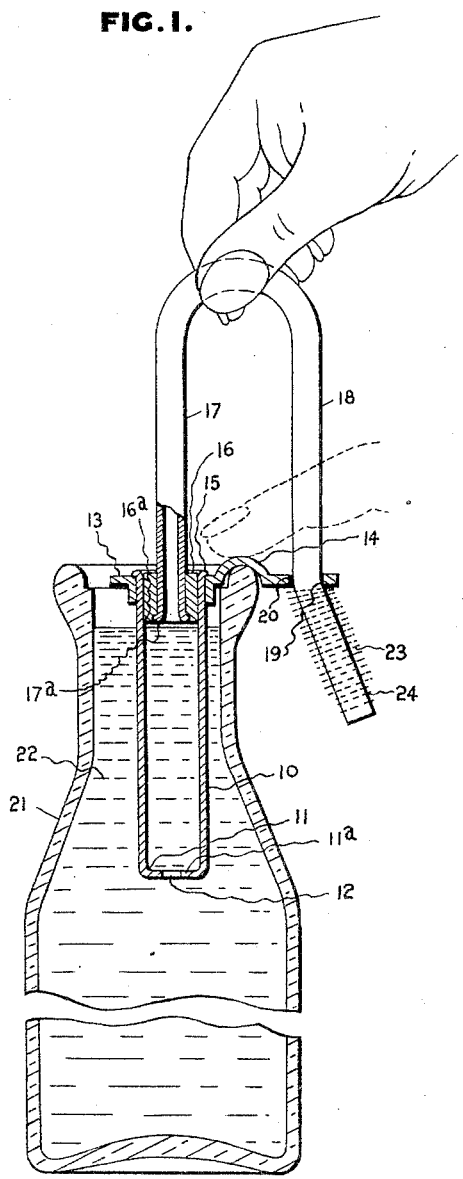
Figure 1 is a side elevation through a milk bottle showing my improved siphon device in a partial sectional view and as applied preparatory to being primed with cream for starting the siphon effect, and showing spring in dotted lines as one of the variations to which the device is susceptible.
Figure 2:
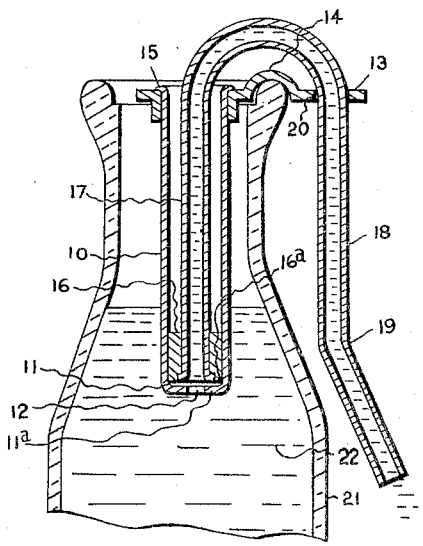
Figure 2 is a sectional view illustrating my siphon device in conjunction with a milk bottle, and in a normal position after the siphon effect has been caused to function.

In operation, the casing 10 is placed in the bottle 21, referring to Figure 1, with liquid therein as at 22, and the humped portion 14 is seated on the top edge of the bottle 21 at which moment the casing will be caused to fill with fluid passing through the passageway 12; now, as the intake tube 17 is depressed, the piston 16 will cause the fluid to be pushed before it with considerable force and a large portion of the fluid will be forced upwardly through the intake tube into the outlet tube for thereby causing the siphon effect to function, as illustrated in Figure 2. A fluid seal is preferably provided by the edge 16ª of the piston cooperating with the piston seat 11 in the casing when piston is seated thus preventing interference with the siphon effect, such as would occur if air should be drawn past the piston through the casing 10 and into the intake tube.

Figure 4:
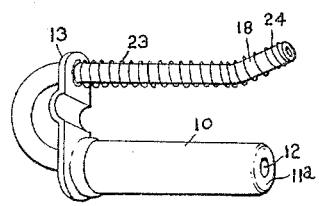
Figure 4 is a horizontal reduced view of my siphon device showing spring which may be desirably positioned on the outlet tube and adapted for automatically snapping the piston to its seat, being one of the variations to which the device is susceptible.

Figure 4 is a reduced view of the siphon device being similar in construction as shown in Figure 1, only having a coiled compression spring 23 contracted at its lower end 24 to form a friction fit to the outlet tube 18 of the siphon, and adapted at its opposite end to bear against the guide member 13, thereby tending to maintain the piston in a seated position. With the spring assembly, the device is placed in the fluid and the guide member held down while the siphon tube may be drawn upwardly as desired, illustrated and indicated by the dotted lines of Figure 1, upon releasing the tube, the spring will automatically snap the piston to its seat thereby forcing the fluid before it for starting the siphon effect, as heretofore described.

While I have illustrated certain modifications of my invention, it is understood that I do not wish to be limited to the exact construction shown and described, as the invention is susceptible to a wide range of variations and still carry out the purpose of the invention.

What I claim as my invention is:

1. In a siphon device, a tube suitably bent to provide an intake tube and an outlet tube, a piston-like portion surrounding and communicable therethrough with said intake tube, a casing, said casing provided with a restricted fluid passageway on its lower portion adapted for communication with said intake tube, and said casing adapted in its upper portion to slidably receive said piston-like portion, means for siphonic seal between said piston-like portion and inner wall of said casing, and said casing provided with supporting means on its upper portion adapted for resting upon the top edge of a receptacle, said supporting means adapted on its opposite portion for slidably receiving said outlet tube, and said outlet tube adapted to allow both limitable and detachable movement in said supporting means.

2. In a siphon device according to claim 1, a spring adapted for cooperation with the aforesaid opposite portion of said supporting means and with said outlet tube and being adapted for snapping the aforesaid piston-like portion to normal position when operated for starting a siphonic action through the aforesaid intake tube and said outlet tube.

In testimony whereof I have hereunto set my hand at Oakland, California, this 1st day of March, 1930.

EDMUND O. SATHER.